United States Patent [19]

Payton

[11] 4,232,719
[45] Nov. 11, 1980

[54] BRUSH HARVESTER

[76] Inventor: Robert E. Payton, P.O. Box 25424, Phoenix, Ariz. 85002

[21] Appl. No.: 32,128

[22] Filed: Apr. 23, 1979

[51] Int. Cl.³ .............................................. A01G 23/08
[52] U.S. Cl. .................................. 144/34 R; 56/13.9; 144/309 AC; 241/101.7; 241/241
[58] Field of Search ................ 241/101.7, 152 A, 241; 56/13.6, 13.7, 13.8, 13.9, 98, 119; 144/2 N, 34 R, 309 AC, 326 R, 3 R

[56] References Cited
U.S. PATENT DOCUMENTS

| | | | |
|---|---|---|---|
| 3,308,860 | 3/1967 | DeShano | 144/218 |
| 3,456,429 | 7/1969 | Sexton, Jr. | 56/13.7 |
| 3,848,399 | 11/1974 | Makeham | 56/13.9 |
| 3,850,375 | 11/1974 | Ford | 241/190 |
| 3,937,261 | 2/1976 | Blum | 144/218 |
| 3,979,075 | 9/1976 | Heron | 144/34 R |
| 3,996,980 | 12/1976 | Pallari | 56/13.9 |
| 4,019,308 | 4/1977 | Quick | 56/13.9 |
| 4,055,309 | 10/1977 | Fleming et al. | 241/241 |

*Primary Examiner*—W. Donald Bray
*Attorney, Agent, or Firm*—Cahill, Sutton & Thomas

[57] ABSTRACT

Apparatus for attachment to and propulsion by a tractor or cross country vehicle for the purpose of cutting, chopping and removing vegetation, particularly dense vegetation and small trees. The apparatus includes a pair of forward horizontal rotary cutters which rotate in opposite directions to sever vegetation and propel it through a pair of opposed guide panels onto a lateral conveyer. A pair of vertical augers disposed on opposite sides of the conveyer rotate in opposite directions to compact vegetation, especially large brush and small trees previously cut by the horizontal rotary cutters, onto the conveyer. A pair of vertical rotary cutters are positioned above the conveyer rearward of the vertical augers. The vertical rotary cutters rotate in opposite directions to further cut large brush or small trees and force them downward onto the conveyer. The conveyer propels the severed and compacted vegetation against blades of a high speed drum-like chopping element which cuts the vegetation into relatively small chips. The chips are fed into a lateral auger which conveys them into a blower. The blower blows the chips through a duct into a container such as a truck bed.

13 Claims, 8 Drawing Figures

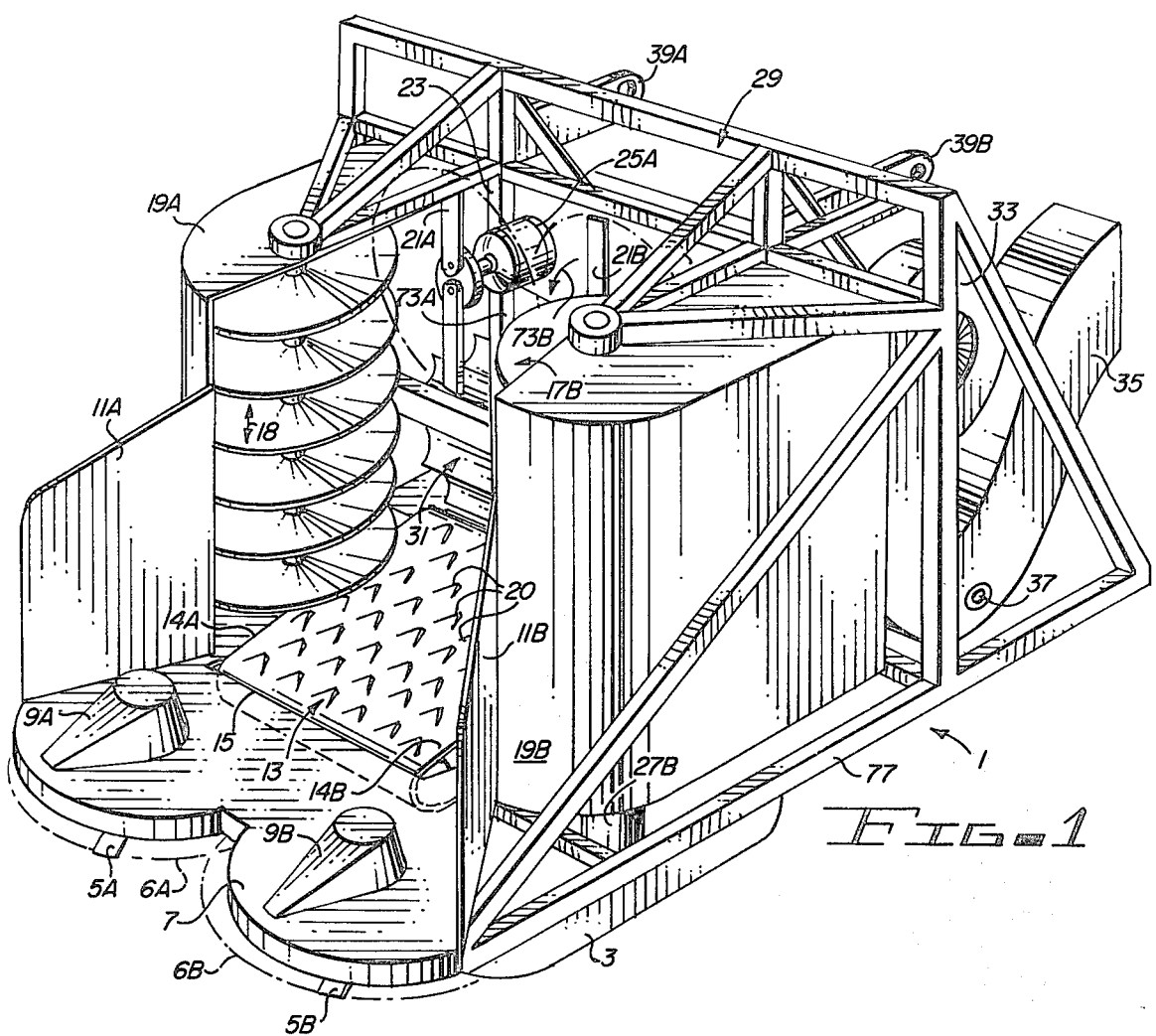
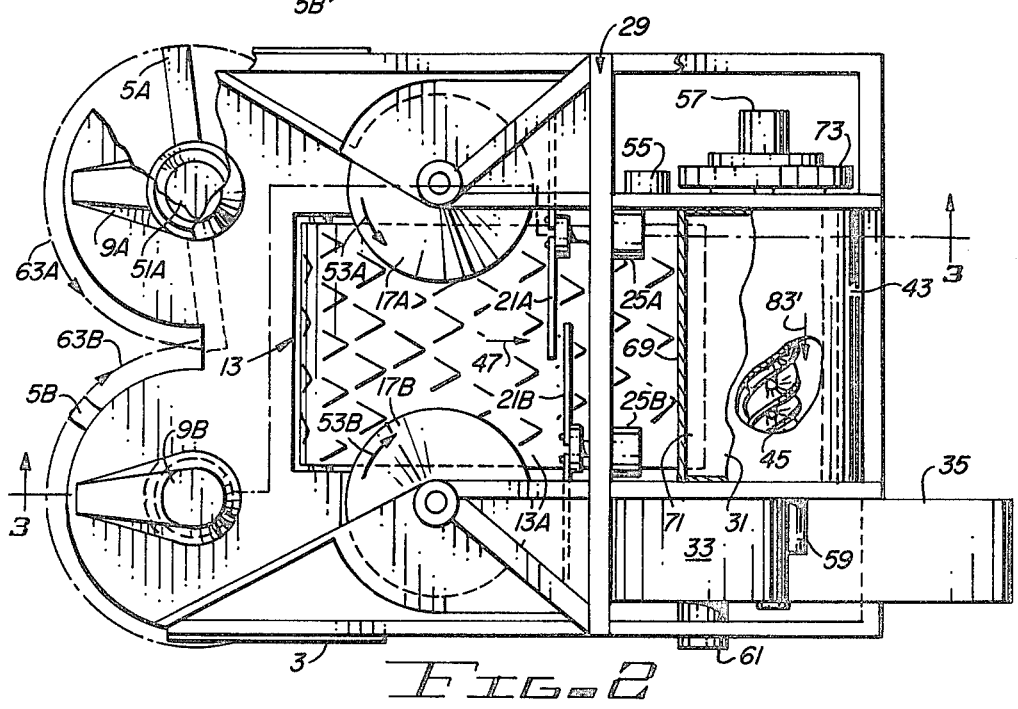

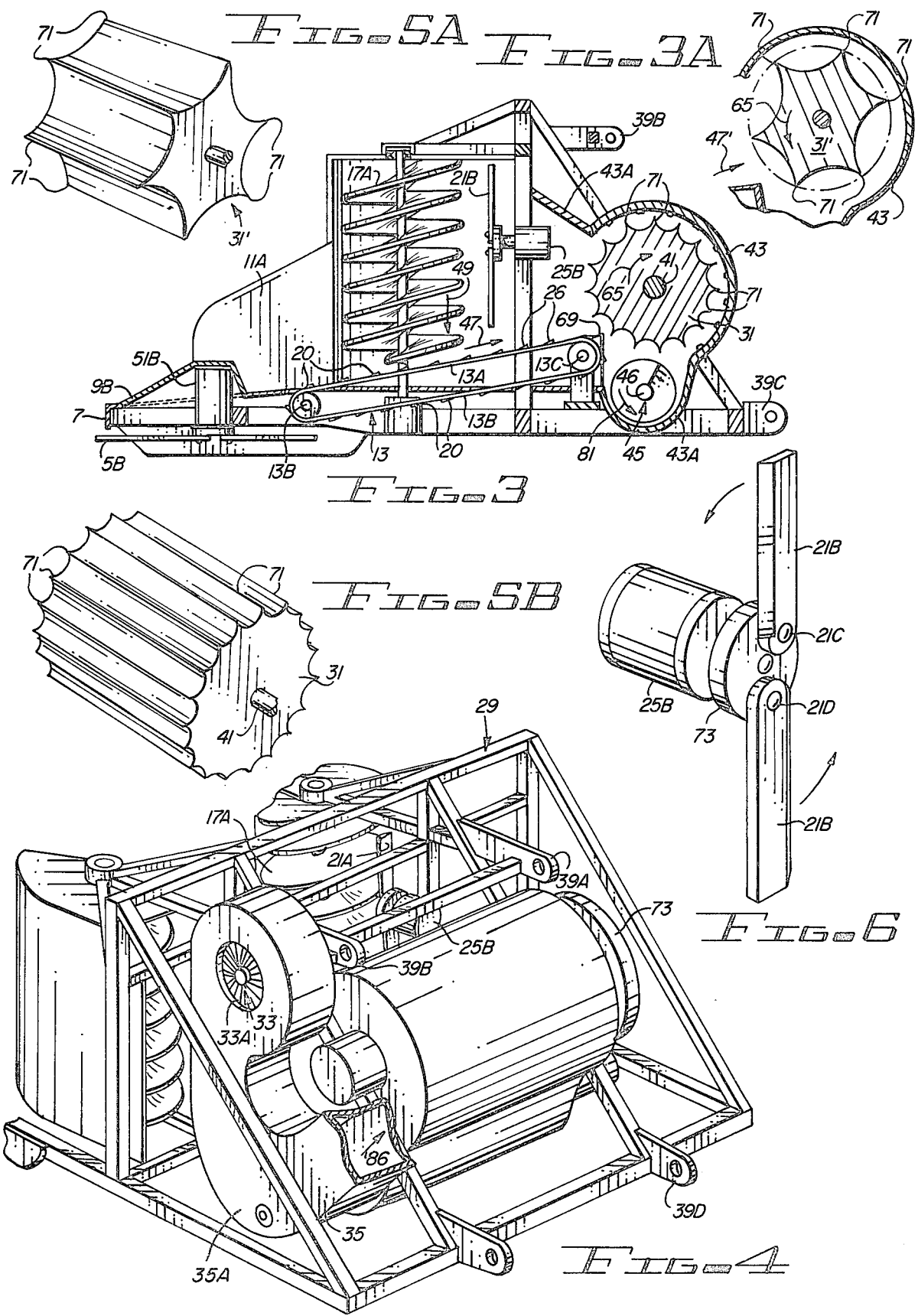

BRUSH HARVESTER

BACKGROUND OF THE INVENTION

1. Field of the Invention

The invention relates to machines for cutting vegetation, and more particularly, to machines for clearing dense, heavy vegetation, including small trees, cutting the vegetation into small chips or pieces, and removing the chips or pieces.

2. Description of the Prior Art

A variety of machines have been proposed for cleaning dense vegetation from land. In some cases, dense, undesirable vegetation grows around right-of-ways, railroads, highways, and various other places where it poses safety and/or health hazards. In other instances, it is necessary to remove dense brush and/or small trees from land in order to make it useful for other purposes, such as farming, building, pipe lines, power lines, etc. In some cases, dense brush, small trees, and the like can be economically harvested to provide the basic materials for making alcohol or to supply chips for making pulp for the paper and compressed board industries. In the past, such land clearing has often been accomplished by means of crawler-type tractors, using dozer blades or chains or hand-held power saws. Many types of vegetation harvesting machines are well known for harvesting conventional crops, such as corn. However, none of the crop harvesting machines are capable of attacking dense brushwood or tree-like vegetation. One type of vegetation clearing unit disclosed in U.S. Pat. No. 3,972,158 discloses an attachment which can be connected to a large articulated tractor. The attachment has five laterally disposed disc-shaped cutting blades with toothed cutting edges which extend forwardly of the housing to form an unbroken cutting line. The tractor merely moves forward, forcing the cutting blades at the bases of brush and trees. The blades rotate so as to move the severed brushwood and vegetation sideways, clearing a path for the tractor to progress along. However, the device does not chop the severed vegetation into chips or remove the brush or trees once they are cut. Separate time consuming and labor consuming operations involving different utilization of different pieces of heavy and expensive equipment are required to remove the cut vegetation and chop it into chips suitable for shipment to and use by various industries, such as the pulp making industry or the alcohol industry. Another clearing machine for brushwood is disclosed in U.S. Pat. No. 3,996,980, and discloses a pair of rotary cutters having sickle-shaped cutting edges which capture brushwood to be cut and move it along stationary blades having the appearance of a giant sawtooth to produce a prolonged slicing action. The weight of the cut brush falls upon the sickle-shaped cutting blades, which rotate in opposite directions, tending to feed the severed brushwood into a chopper, which produces chips. The entire unit is attachable to a tractor. The unit has an overhead framework which extends forward of the cutting blades, and tends to push tall shrubbery forward before it is reached by the cutting blades.

Neither of the above described machines is suitable for economically clearing land of heavy vegetation which includes dense brush and small to medium sized trees. Although the device disclosed in U.S. Pat. No. 3,972,158 is indeed capable of cutting trees having large trunk diameters, this does not solve the other problems described above. The cutting blades of the device disclosed in U.S. Pat. No. 3,996,980 would easily become jammed if rocks or wood material having hardness or size exceeding predetermined hardness or size is encountered by the cutting blades. Further, the slicing action results in rapid dulling of the cutting edges. The device of U.S. Pat. No. 3,996,980 is suitable only for cutting relatively small brushwood and very small, flexible trees. Reliance upon the rotating action of the cutting blades to feed the cut brushwood, etc., into the chopper produces relatively unreliable operation.

Accordingly, it is an object of the invention to provide a machine for clearing land, which machine is capable of severing unflexible tree trunks, as well as dense, heavy brushwood and converting the severed trees and brushwood into small chips capable of being blown by a blower unit into a suitable container for subsequent utilization.

Another object of the invention is to provide a vegetation clearing machine which more efficiently cuts and conveys dense brushwood and medium sized trees into chips easily useable by the wood pulp and alcohol industries.

Yet another object of the invention is to provide a vegetation clearing machine which conveys initially severed brushwood and trees into pieces which are of more suitable size for ingestion by a high speed chopper unit than the clearing machines of the prior art.

Still another object of the invention is to provide a vegetation clearing machine which, after severing brushwood, trees and the like, conveys the cut vegetation to a high speed chopper more efficiently than prior vegetation clearing or harvesting machines.

A further object of the invention is to provide a machine for clearing heavy brushwood and small to medium sized trees from land and reduce the cut material to small chips, which machine overcomes the shortcomings of the known prior art.

A novelty search directed to the present invention uncovered, in addition to the two previously mentioned patents, the following patents: U.S. Pat. Nos. 2,477,794, 3,673,774, 4,098,060, and 3,919,830. These patents all disclose harvesters for harvesting stalk-type crops. Various combinations of conveyers, cutters, and augers for cutting and conveying stalk-type crops, such as sugar cane or corn, are disclosed. However, none of the disclosed machines would be suitable for clearing heavy brushwood and the like.

SUMMARY OF THE INVENTION

Briefly described, and in accordance with one embodiment thereof, the invention provides a vegetation clearing machine capable of forward movement causing a pair of horizontal rotary cutters to sever vegetation, including dense brushwood, small to medium sized trees, and the like. The rotary cutters rotate in opposite directions, tending to force severed vegetation between the horizontal rotary cutters, across a guard plate above the horizontal rotary cutters, between a pair of upright guide plates, and onto the input end of a substantially lateral conveyer. The conveyer includes a continuous conveying element or belt. A pair of vertical augers are disposed on either side of the conveyer and rotate to engage bulky vegetation and force it downward, thereby compacting it against the upper surface of the conveyer, enabling the conveyer to move the compacted vegetation rearward. The outer surface of the conveyer belt includes spaced barb-like or tooth-like protrusions which aid the conveyer belt to engage the severed vegetation and move it rearward. A pair of upright rotary cutters located above the conveyer and rearward of the vertical augers further sever the bulky vegetation as it is moved rearward toward the output end of the conveyer. The rotary cutters rotate in opposite directions, tending to further force dense vegetation downward against the conveyer as they cut the dense vegetation. The upper portions of tall vegetation are chopped off by the upright rotary cutters as the tall vegetation falls rearward between the vertical augers after being severed by the horizonal rotary blades, due to forward movement of the vegetation clearing machine.

Material at the outlet end of the conveyer is moved into a horizontal high speed chopper unit having a plurality of cutting blades disposed on a drum-like support which rotates about an axis perpendicular to the direction of movement of the conveyer belt. Vegetation moved into the chopper unit is chopped into relatively small chips as the vegetation is cut between a stationary cutting edge and the rotating blades of the chopper unit. The chips fall into a horizontal auger which laterally moves the chips into a blower unit. The blower unit blows the chips through a duct into a receiving container. In the described embodiment of the invention, the above described elements are all supported by a frame which can be attached to a large tractor having a hydraulic pump coupled to the vegetation clearing devices. The vegetation clearing device includes a plurality of hydraulic motors for powering the respective rotary cutters, the augers, the conveyer, the chopper and the blower unit. Pneumatic tubes coupling the various hydraulic motors to the hydraulic pump on the tractor are provided.

BRIEF DESCRIPTION OF THE DRAWINGS

FIG. 1 is a perspective view of the vegetation clearing device of the invention.

FIG. 2 is a partial cutaway top view of the vegetation clearing device of FIG. 1.

FIG. 3 is a partial section view taken along section lines 3—3 of FIG. 2.

FIG. 3A is a partial section view illustrating a chopper unit which can be utilized in the vegetation clearing device.

FIG. 4 is a partial perspective view of the vegetation clearing device of FIG. 1 showing the rear end thereof.

FIG. 5A is a perspective view illustrating the cutting drum of the chopper unit of FIG. 3A.

FIG. 5B is a perspective view showing the cutting edges of the chopper unit shown in FIG. 3.

FIG. 6 is a perspective view illustrating one of the rotary cutters and the hydraulic motor powering it.

DESCRIPTION OF THE INVENTION

Referring now to the drawings, particularly to FIG. 1, vegetation clearing machine 1 has a front end supporting a pair of horizontal rotary cutters 5A and 5B, the ends of which follow paths indicated by reference numeral 6A and 6B, respectively. Rotary cutter 5A is more clearly shown in the partial cutaway top view shown in FIG. 2 and is supported by and powered by a hydraulic motor 51A supported on guard plate 7 and covered by protective housing 9A.

Guard plate 7 is supported on a pair of rails such as 77 which constitute a portion of a frame generally indicated by reference numeral 29 in FIG. 1.

Rotary cutter blade 5A rotates counterclockwise, as indicated by arrow 63A in FIG. 2, and rotary cutter 5B rotates in the opposite direction, as indicated by arrow 63B in FIG. 2. The two rotary cutter blades are slightly offset to avoid clashing during operation, as paths 6A and 6B intersect to ensure that no gaps exist in the path of severed vegetation.

It should be noted that vegetation clearing device 1 rests on a pair of skids, such as skid 3 in FIG. 1, and can be attached to a lift apparatus of a large tractor, for example, of the crawler or articulated type, by means of attachment members 39A, 39B, 39C, and 39D, as shown in FIG. 4. An operator of the tractor then can controllably lift vegetation clearing machine 1 to the desired height and can also tilt it at the desired angle so that horizontal rotary cutters 5A and 5B sever thick brushwood and small to medium sized trees and the like as the tractor slowly moves forward. However, ordinarily, the operator permits skids 3 to support some of the weight of vegetation clearing machine 1 as it is moved slowly forward by the tractor.

As vegetation clearing machine 1 is slowly pushed forward through vegetation of the type described, the severed vegetation tends to fall rearward upon guard plate 7 between horizontal rotary cutters 5A and 5B due to the forward motion of vegetation clearing machine 1 and due to pressure by subsequently cut vegetation. Vertical guide plates 11A and 11B are attached to opposite sides of guard plate 7 and frame 29 and are fanned outward to collect and guide severed vegetation rearward to the inlet end of a conveyer belt system 13.

The presence of guard plate 7 prevents severed vegetation from falling on rotating cutter blades 5A and 5B, which would cause the vegetation to be thrown about and damage the blades. The opposed rotation directions of horizontal cutter blades 5A and 5B tend to cause severed vegetation to be swept rearward between horizontal rotating cutter blades 5A and 5B, thereby aiding movement of severed vegetation onto the receiving end of conveyer 13.

A pair of large vertical augers 17A and 17B are disposed on either side of conveyer 13. The continuous helical blades of vertical augers 17A and 17B extend substantially beyond edges 14A and 14B of conveyer 13. The spacing between adjacent portions of each continuous helical blade is sufficiently great to accommodate any thickness of wood cut by horizontal rotary cutters 5A and 5B. This distance is indicated by arrow 18 in FIG. 1; a spacing 18 of approximately 12 to 14 inches is satisfactory.

Conveyer 13 includes a continuous steel-reinforced belt having an upper portion 13A and a lower portion 13B, as shown in more detail in FIG. 3. The belt conveyer 13 moves about rollers 13B and 13C. Roller 13C is somewhat elevated with respect to roller 13B producing a slight upward slope of the belt of conveyer 13. At least one of rollers 13B and 13C are powered by a hydraulic motor, such as hydraulic motor 55 shown in FIG. 2. A plurality of teeth 20 are disposed along the outer surface of conveyer belt 13A, 13B to aid in grasping or engaging of severed vegetation by conveyer 13 to move the vegetation rearward. The teeth are approximately one inch in height and are spaced approximately 3 inches apart.

As vegetation, especially thick brushwood and the like is forced into the region between guide plates 11A and 11B and into the region above conveyer 13 and between augers 17A and 17B, the rotation of vertical augers 17A and 17B in the directions indicated by arrows 53A and 53B (FIG. 2) causes portions of the vegetation to extend into the gaps between portions of the continuous blades of vertical augers 17A and 17B. This has the effect of compacting the vegetation downward onto the upper belt portion 13A of conveyer 13. The upper belt portion 13A of conveyer 13 moves in the direction indicated by arrow 47 in FIG. 3, thereby causing vegetation to also be moved in the direction indicated by arrow 47 and toward the outlet end of conveyer 13, which is adjacent to the input of a chopper unit subsequently described.

The direction of compaction of brushwood as vertical augers 17A and 17B rotate is indicated by arrow 49 in FIG. 3.

A pair of vertical rotary chopper blades 21A and 21B are disposed above the rearward portion of conveyer 13. Vertical rotary cutter blades 21A and 21B are supported by and powered by hydraulic motors 25A and 25B, respectively, which hydraulic motors are mounted on rigid members of steel frame 29.

Vertical rotary cutter blades 21A and 21B rotate in the directions indicated by arrows 73A and 73B in FIG. 1, and thereby further sever vegetation, which then is moved rearward by the combined action of conveyer 13 and by the rotation of vertical augers 17A and 17B. Vertical rotary cutter blades 21A and 21B are offset as shown in FIG. 2 to avoid clashing of the blades during operation. It should be noted that the rotation of vertical augers 17A and 17B in the directions indicated by arrows 53A and 53B, respectively, in FIG. 2, force vegetation engaged by vertical augers 17A and 17B in the rearward direction in addition to compacting the severed vegetation downward against upper conveyer belt portion 13A. This forces vegetation in the region between the vertical augers into the path of vertical rotary cutting blades 21A and 21B. Rotating cutter blades 21A and 21B further sever the vegetation as it moves rearward on conveyer 13 and also force the further severed vegetation downward against upper conveyer belt portion 13A. Thus, large bulky pieces of brushwood are severed and also are forced downward between vertical rotary blades 21A and 21B against upper conveyer belt section 13A. The severed vegetation is then moved rearward toward chopper blade 31 by the rearward movement of upper conveyer belt portion 13A.

The chopper unit of vegetation clearing machine 1 includes rotary chopper element including a drum-shaped rotary blade supporting element having a plurality of sharp longitudinal cutting blades or edges thereon. Chopper element 31 rotates in the direction indicated by arrow 65 in FIG. 3 about an axis parallel to the direction of travel of conveyer belt portions 13A and 13B. As seen from the top view of FIG. 2, chopper blades 71 extend approximately the width of conveyer belt portions 13A and 13B.

The chopper unit includes an adjustable cutting edge 69 rigidly supported by a member of frame 29. The individual blades 71 of rotary chopper element 31 chop pre-severed pieces of vegetation received from the outlet end of conveyer 13 into small chips, since upper belt portion 13A moves rearward at a fairly slow rate, while rotating chopper element 31 rotates at relatively high speed. The chopped pieces have a thickness of roughly one fourth of an inch, their length and width depending on the size of the piece of wood being chopped.

Rotary chopper element 31 rotates on an axle 41, which is supported in bearings (not shown) mounted on a pair of rigid strut members 79A and 79B of frame 29. A heavy flywheel 73 (approximately three hundred pounds) is attached to one end of axle 41 to provide a large amount of momentum to enable rotary chopper element 31 to smoothly and continuously chop dense or thick pieces of wood or brushwood.

Rotary chopper element 31 is surrounded by a housing 43 which prevents pieces of chopped vegetation from being thrown outward and escaping during the chopping operation. A front section 43A (FIG. 3) extends upwardly and forwardly toward the vertical rotary cutters to guide incoming vegetation into the inlet of the chopper unit.

A horizontal auger 45 is disposed directly beneath rotary chopper element 31. Horizontal auger 45 rotates on an axle 46 which is parallel to axle 41 about which rotary chopper element 31 rotates. Horizontal auger 45 rotates in the direction indicated by arrow 81 in FIG. 3. This causes vegetation chips chopped by the chopper unit to fall or be propelled into the space between portions of the continuous helical blade of auger 45, to be moved laterally in the direction indicated by arrow 83 in FIG. 2. The laterally conveyed chips are deposited in a lower section 35A of a duct 35. A high speed blower 33 forces air through an intake 33A out of duct 35 in the direction indicated by arrow 86 in FIG. 4. Thus, the vegetation chips produced by the chopper unit can be blown into a suitable container, for example, a truck or cart traveling adjacent to or behind the tractor to which vegetation clearing machine 1 is attached.

The details of rotary chopper element 31 are shown in greater detail in the perspective view of FIG. 5B. An alternate chopper cutting element 31' having fewer cutting edges 71 is disclosed in FIGS. 3A and 5A.

The various augers, the rotary cutters, the chopper, and the conveyer are all powered by hydraulic motors. As previously explained, the horizontal rotary chopping blades 5A and 5B are powered by hydraulic motors such as 51A of FIG. 2. Vertical rotary cutter blades 21A and 21B are powered by hydraulic motors 25A and 25B, respectively. FIG. 6 illustrates the manner of attaching the rotary blades to a hydraulic motor. More specifically, a cylindrical mounting plate 73 is mounted on the drive shaft of hydraulic motor 25B. Cutter blade 21B' are pivotally attached to opposite sides of cylindrical support 73 by means of pivot pins 21C and 21D, respectively. This "floating" blade arrangement avoids undue shock and damage to the sharp cutting edges of the cutting blades and to the overall system when the cutting blades 21B strike rocks or objects which are too hard or too thick to be cut.

The length of vegetation clearing machine 1 is roughly 15 to 17 feet. Vertical augers 17A and 17B are approximately 5 feet in height and 2½ to 3 feet in diameter. Horizontal rotary cutting blades 5A and 5B are approximately 4 feet in diameter, as are vertical rotary cutters 21A and 21B. The diameter of chopper element 31 is approximately 2.8 feet. The length and width of conveyer 13 are approximately 6 feet and 4 feet, respectively.

Hydraulic motors 51A and 51B which power horizontal rotary cutters 5A and 5B, respective, are 50 horsepower motors which cause the horizontal rotary cutting blades to rotate in the range from 1000 to 1500 rpm. Hydraulic motors 25A and 25B which drive vertical rotary cutters 21A and 21B, respectively, are 25 horsepower hydraulic motors which rotate at speeds in the range from 1000 to 1500 rpm. Vertical augers 17A and 17B are rotated at approximately 500 rpm by 10 horsepower hydraulic motors 27A and 27B. Conveyer belt 13A, 13B travel at approximately 25 feet per second, and is driven by hydraulic motor 55 (FIG. 2) which is a 10 horsepower motor. Rotary chopper element 31 rotates at approximately 3000 rpm, and is driven by a 75 horsepower hydraulic motor. Horizontal auger 45 rotates at approximately 500 rpm, and is driven by a 5 horsepower hydraulic motor. Blower 33 is driven by a 25 horsepower hydraulic motor 61, shown in FIG. 2.

For optimum performance, the cutting edges of the rotary cutters and the chopper unit should be composed of high quality steel to avoid chipping due to rocks and other hand foreign objects. The various strut and web members of frame 29 are welded steel I-beam and angle iron members. The conveyer belt can be made of conventional steel reinforced or fabric reinforced belt material commonly used in various industrial conveyers. The use of separate hydraulic motors to power all of the cutting elements and auger elements permits independent speed control of the various rotating elements in order to optimize overall performance of the vegetation clearing machine.

While the invention has been described with reference to a particular embodiment thereof, those skilled in the art will be able to make various modifications in the placement and arrangement of parts without departing from the true spirit and scope of the present invention. For example, the cutting edges of the rotary chopper element could be spirally disposed on the rotary cutting element in order to achieve a slicing effect as vegetation is cut between the cutting edges of the rotary chopping element and stationary cutting edge. Electric motors could be utilized instead of hydraulic motors where desirable.

I claim:

1. An apparatus for clearing vegetation, including brushwood and small trees, and producing chips therefrom, said apparatus comprising in combination:
   a. horizontal cutting means disposed along a front end of said vegetation clearing apparatus for severing vegetation including brushwood, trees and the like as said vegetation clearing apparatus moves forward;
   b. conveyer means for receiving severed vegetation as said vegetation clearing apparatus moves forward, said conveyer means having an inlet end and an outlet end, said conveyer means conveying the severed vegetation from said inlet end to said outlet end;
   c. compacting means for forcing severed vegetation downward against said conveyer means to effect rearward movement of said vegetation by said conveyer means;
   d. chopping means for receiving severed vegetation from the outlet end of said conveyer means and chopping the vegetation into chips and;
   e. output means for receiving the chips from said chopping means and exhausting the chips into a container wherein said conveying means includes a continuous belt-like conveying element for engaging the severed vegetation and conveying the severed vegetation toward the outlet end, said conveyer means also including a pair of pulley-like roller elements for powering said conveying element to cause the upper portion of said conveying element to move from the inlet end to the outlet end of said conveyer means.

2. The vegetation clearing apparatus of claim 1 further including upright cutting means for further cutting severed vegetation into smaller pieces as the severed vegetation is moved rearward toward said chopping means by said conveyer means.

3. The vegetation clearing apparatus of claim 1 wherein said horizontal cutting means includes a pair of horizontal rotary cutters which rotate in opposite directions to move severed vegetation between said horizontal rotary cutters toward the input end of said conveyer means.

4. The vegetation clearing apparatus of claim 3 further including a guard plate above said rotary cutters, said severed vegetation passing over said guard plate to the inlet end of said conveyer means.

5. The vegetation clearing apparatus of claim 4 further including a pair of opposed guide plates for funneling severed vegetation into the input end of said conveyer means.

6. The vegetation clearing apparatus of claim 2 wherein said upright cutting means includes a pair of upright rotary cutters which rotate in opposite directions to further sever vegetation, especially bulky vegetation, moving rearward toward said chopping means, said pair of upright rotary cutters rotating in opposite directions to force vegetation severed by said upright rotary cutting blades between said upright rotary cutting blades and downward toward said conveyer means.

7. The vegetation clearing apparatus of claim 1 further including a plurality of hydraulic motors for powering said horizontal cutting means, said conveyer means, said compacting means, said chopping means, and said output means, respectively.

8. The vegetation clearing apparatus of claim 7 further including mounting means for attaching said vegetation clearing apparatus to the front end of a tractor and pneumatic coupling means for coupling said hydraulic motors to a hydraulic pump powered by said tractor.

9. The vegetation clearing appartus of claim 1 wherein said belt-like conveying element includes a reinforced conveyer belt having an outer surface, a plurality of spaced vegetation-engaging elements extending outwardly from said outer surface to effect said engaging of the severed vegetation.

10. An apparatus for clearing vegetation, including brushwood and small trees, and producing chips therefrom, said apparatus comprising in combination:
   a. horizontal cutting means disposed along a front end of said vegetation clearing apparatus for severing vegetation including brushwood, trees and the like as said vegetation clearing apparatus moves forward;
   b. conveyer means for receiving severed vegetation as said vegetation clearing apparatus moves forward, said conveyer means having an inlet end and an outlet end, said conveyer means conveying the severed vegetation from said inlet end to said outlet end;
   c. compacting means for forcing severed vegetation downward against said conveyer means to effect rearward movement of said vegetation by said conveyer means;

d. chopping means for receiving severed vegetation from the outlet end of said conveyer means and chopping the vegetation into chips; and e. output means for receiving the chips from said chopping means and exhausting the chips into a container, wherein said compacting means includes a pair of upright auger elements extending from said conveyer means a substantial distance above said conveyer means, said auger elements each including spiral blade portions extending over said conveyer means, said compacting means also including means for rotating said auger elements to cause said blades of said auger elements to engage severed vegetation located a substantial distance above said conveyer means between said auger elements and force the engaged vegetation downward against said conveyer means to effect rearward movement of said vegetation by said conveyer means.

11. An apparatus for clearing vegetation, including brushwood and small trees, and producing chips therefrom, said apparatus comprising in combination:

a. horizontal cutting means disposed along a front end of said vegetation clearing apparatus for severing vegetation including brushwood, trees and the like as said vegetation clearing apparatus moves forward;

b. conveyer means for receiving severed vegetation as said vegetation clearing apparatus moves forward, said conveyer means having an inlet end and an outlet end, said conveyer means conveying the severed vegetation from said inlet end to said outlet end;

c. compacting means for forcing severed vegetation downward against said conveyer means to effect rearward movement of said vegetation by said conveyer means;

d. chopping means for receiving severed vegetation from the outlet end of said conveyer means and chopping the vegetation into chips; and e. output means for receiving the chips from said chopping means and exhausting the chips into a container, wherein said chopping means includes a horizontal rotating drum-like cutting element having an axis of rotation perpendicular to the direction of movement of said conveying means, a plurality of cutting edges being disposed on said drum-like cutting element, said chopping means further including a stationary cutting edge, said vegetation being chopped between said plurality of cutting edges of rotating drum-like cutting element and said stationary cutting edge.

12. The vegetation clearing apparatus of claim 11 wherein said output means includes a horizontal auger disposed in a housing beneath said drum-like cutting element for collecting chips produced by said chopping means.

13. The vegetation clearing apparatus of claim 12 wherein said output means includes a blower having a chip receiving means for receiving chips moved laterally beneath said drum-like cutting element by said horizontal auger, said blower means blowing said chips through a duct into said container.

* * * * *